United States Patent [19]

Petri et al.

[11] Patent Number: 5,656,777
[45] Date of Patent: Aug. 12, 1997

[54] MINIATURE BOX VIBRATING GYROSCOPE

[75] Inventors: Fred Petri, Snohomish; Mark P. Helsel, Seattle, both of Wash.

[73] Assignee: AlliedSignal, Inc., Morristown, N.J.

[21] Appl. No.: 663,341

[22] Filed: Jun. 13, 1996

[51] Int. Cl.$^6$ ........................................... G01P 9/04
[52] U.S. Cl. ................... 73/504.12; 73/504.13
[58] Field of Search ............... 73/504.12, 504.13, 73/504.04, 504.02

[56] References Cited

U.S. PATENT DOCUMENTS

| | | | |
|---|---|---|---|
| 4,896,268 | 1/1990 | MacGugan | 73/504.04 |
| 5,226,321 | 7/1993 | Varnham et al. | 73/504.13 |
| 5,476,007 | 12/1995 | Nakamura | 73/504.12 |

OTHER PUBLICATIONS

A. Rogner, et al. "The LIGA technique—What are the new opportunities?", SUSS Report, vol. 6, Third Qtr. 1993, pp. 1–9.

J. D. Johnson, et al. "Surface Micromachined Angular Rate Sensor", Delco Electronics Corp., Indiana (undated, 7 pages).

A. Matthews, et al. "The Hemispherical Resonator Gyro: New–Technology Gyro for Space", S92–157, pp. 1–6, Delco Electronics Corp., CA (undated).

D. Hughes, M. Mecham, "Delco Resonator Gyro Key to New Inertial Systems", Avaition Week & Space Technology, Sep. 30, 1991, pp. 48–49.

"Delco's Space Inertial Reference Unit" (2 page brochure), S92–156, Aug. 1992, 2 pgs, Delco Electronics.

"Hemispherical Resonator Gyroscope; Response to RFI for LEAP IMU" prepared for Boeing Aerospace by Delco Sys. Operations, CA, Dec. 1986, S86–281, 16 pgs.

"Hemispherical Resonator Gyro" (2 page info sheet), Delco Avionics Sales, Milwaukee, WI (undated).

HRG Carousel Inertial Navigation Systems info sheets–11 pages (undated).

Delco Modular Navigation Systems info sheets–13 pages (undated).

"Carousel 400: a new family of inertial navigation systems" (4 pg brochure), Delco Electronics (undated).

Primary Examiner—John E. Chapman

[57] ABSTRACT

An open top box structure is micromachined on a base, such as a crystalline silicon substrate, and drive and sensing devices are fabricated on the same substrate. Output transducers sense Coriolis force changes by processing signals representing force components at the corners of the vibrating box structure as it is rotated to yield angular rate measurement.

18 Claims, 6 Drawing Sheets

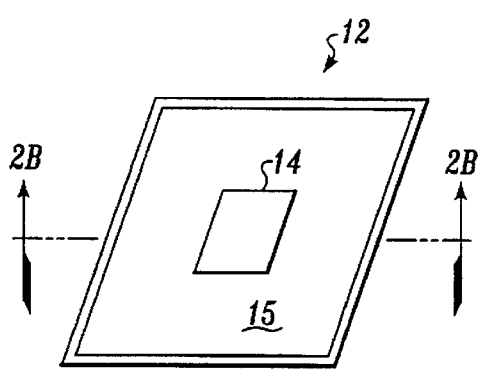
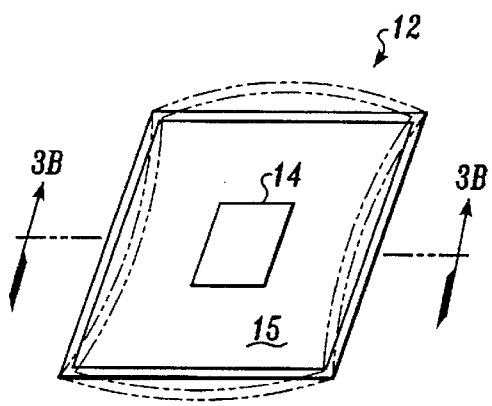
Fig. 2A
Fig. 3A
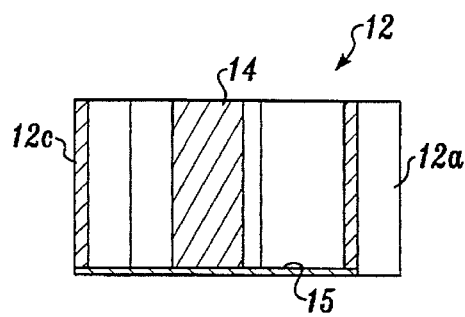
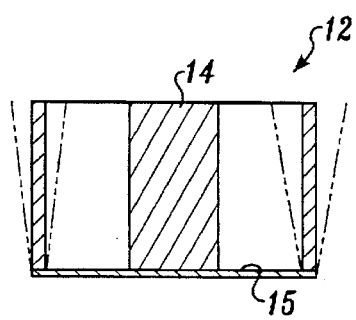
Fig. 2B
Fig. 3B
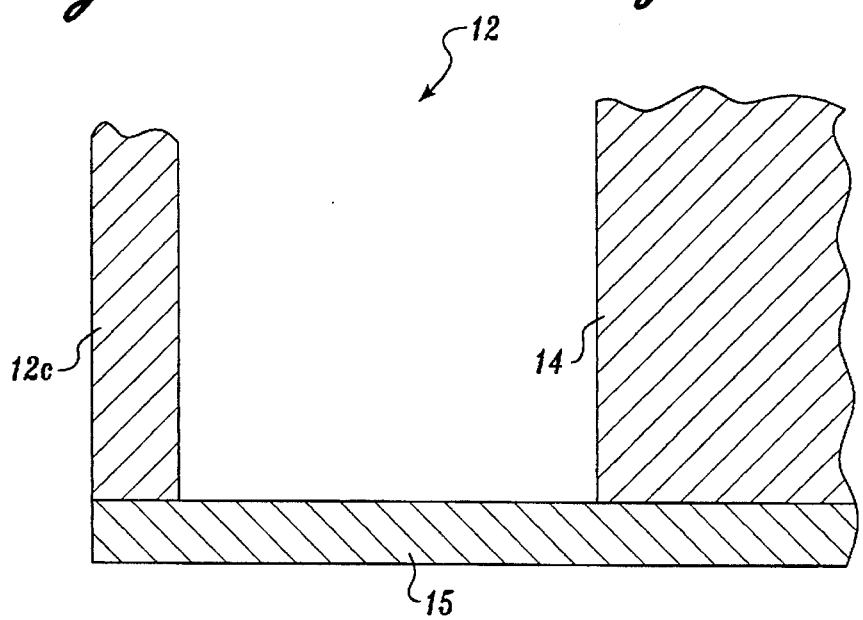
Fig. 2C

MINIATURE BOX VIBRATING GYROSCOPE

TECHNICAL FIELD

The present invention generally pertains to gyroscopes and more particularly to inertial grade miniature gyroscopes of the type in which vibration is induced in micromachined, structural elements and acceleration effects including Coriolis angular rate are sensed by measuring force changes in the vibrating structure.

BACKGROUND OF THE INVENTION

Inertial grade vibrational gyroscopes have been built primarily using piezo-electric devices as drivers for bell or "wine glass" shape resonators. The primary shortcoming with these devices is their size and cost. Multi-sensors using miniature vibrating beams to sense Coriolis forces developed by hinged proof masses have also been developed to sense both acceleration and angular rate. These later devices have small size and low cost advantage but fall short of inertial grade accuracy.

The purpose of the present invention is to provide a miniature gyroscope capable of measuring angular rate to inertial grade accuracy at substantially reduced cost and size compared to existing instruments.

SUMMARY OF THE INVENTION

The angular rate sensing mechanism employs Coriolis specific force sensing techniques, and in its preferred form is fabricated using state of the art micro machine chemical or plasma etch techniques for forming cyrstalline silicon parts. The mechanism can also be fabricated from other materials using an anisotropic depth etch, x-ray lithography, electroplating and moulding process known as LIGA.

In general, an open top box structure is formed on a base, such as a crystalline silicon substrate, and drive and sensing devices are fabricated on the substrate. The drive or actuator components induce resonant vibration in the box walls. Output transducers sense acceleration changes by processing signals representing changing force components at the corners of the box structure, wherein the corners assume the role of relatively stationary nodes compared to the vibrating walls. In a preferred embodiment, a magnet is used to coact with alternating drive current in electrodes on the box substrate to impart vibration to the box walls and to excite force sensing transducers of the double ended tuning fork (DETF) type that in turn are responsive to stress-strain forces at the box corners.

BRIEF DESCRIPTION OF THE DRAWINGS

FIGS. 2A, 2B, and 2C are respectively top plan view, side sectional view, and enlarged fragment of a parallelogram box structure fabricated from a wafer substrate of crystalline silicon in accordance with the preferred embodiment;

FIGS. 3A and 3B are corresponding top and side sectional views of the box structure of FIGS. 2a and 2b in which dotted line positions of the box walls indicate the natural structural vibration of the walls induced to measure Coriolis rate;

DETAILED DESCRIPTION

The vibrating miniature gyroscope 10 described herein, is shown in FIGS. 1, 2A, 2B, and 2C and excites a box structure 12 into a primary vibrational mode driven by periodic forces F induced by a current I through conductor electrodes 20a–d (FIG. 4) and a magnetic field B perpendicular to the conductors. The force developed is given by:

$$F = B \times I$$

where:

F=Force exerted on the conductor

B=Magnetic field

I=Current carried by conductor

In all descriptions and figures, the X, Y and Z axes represent both the inertial coordinate system and the crystal axes of the silicon. For a silicon device that has cubic symmetry, the axes are arbitrary as far as the device is concerned. The Z axis is the input axis of the rate sensor about which rotation is sensed, the X and Y axes are the axis along which the Coriolis velocity vector is generated.

Figure 1:
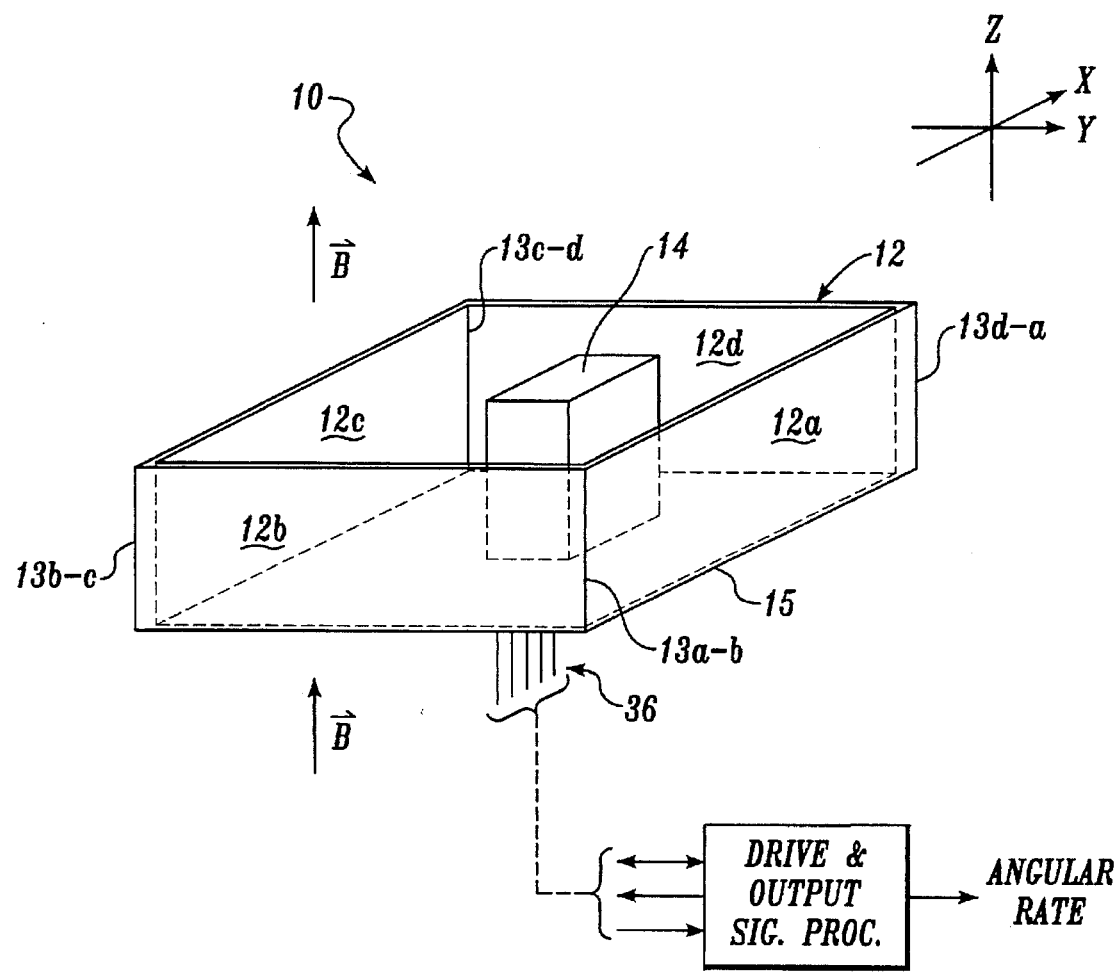
FIG. 1 is an isometric view of a miniature box structure in which the walls of the box are driven into a natural mode of vibration by drive actuators and the Coriolis effect causes forces on the box walls that are a measure of angular rate of rotation of the structure.

The basic mechanism as shown in FIG. 1 consists of an open top, i.e., open faced "box" structure 12. In FIG. 1, the preferred abutment mounting structure 14 is shown in the center of the box; however, alternate mounting means are also appropriate. In order to achieve practical dimensions, the walls of the box of crystalline silicon are etched in the 110 plane of the silicon. This will result in a parallelogram shaped "box" as shown in FIGS. 1, 2A and 2b, with included angles of 70.5 and 109.5 degrees, respectively, determined by the crystalline structure of the silicon substrate and an etching fabrication process. For example, a potassium hydroxide silicon etching described by H. A. Waggener in "Electrochemically Controlled Thinning of Silicon", Bell Systems Technical Journal, Vol. 49, No. 3, 1970, p. 473, may be used. Other fabrication processes may be used including reactive plasma etching with a silicon wafer having silicon on insulator (SOI) to provide etch stop for potassium hydroxide etching or for deep silicon anisotropic reactive ion etching (RIE). LIGA micromachining is still another available process. The box walls 20 and central mounting structure 14 are the result of etching a silicon wafer down to a relatively thin epitaxial layer that serves as the box base 15.

Opposite walls 12a,c and 12b,d of the box are driven into resonance such that they vibrate 180 degrees out of phase as shown in FIGS. 3A, B. The corners 13a–b, 13b–c, 13c–d and 13d–a of the box are "nodal" points which remain substantially stationary on base 15 compared to the moving walls in this resonance mode.

When the device is rotated about the Z axis, the Coriolis forces produced by the vibrating walls is given by:

$$F=2*m*\Omega*dr/dt$$

where

F=Coriolis force
m=mass of wall
$\Omega$=rotation about Z axis
dr/dt=velocity of wall along X or Y axis A rotation about the Z axis will result in forces substantially parallel to the walls of the parallelogram box 12. Opposite corners will have opposite Coriolis induced forces, the adjacent corners will also have opposite forces. By sensing the forces at all the corners in accordance with the preferred embodiment, common mode rejection sensing techniques result in substantial cancellation of temperature and acceleration errors.

Figure 4:
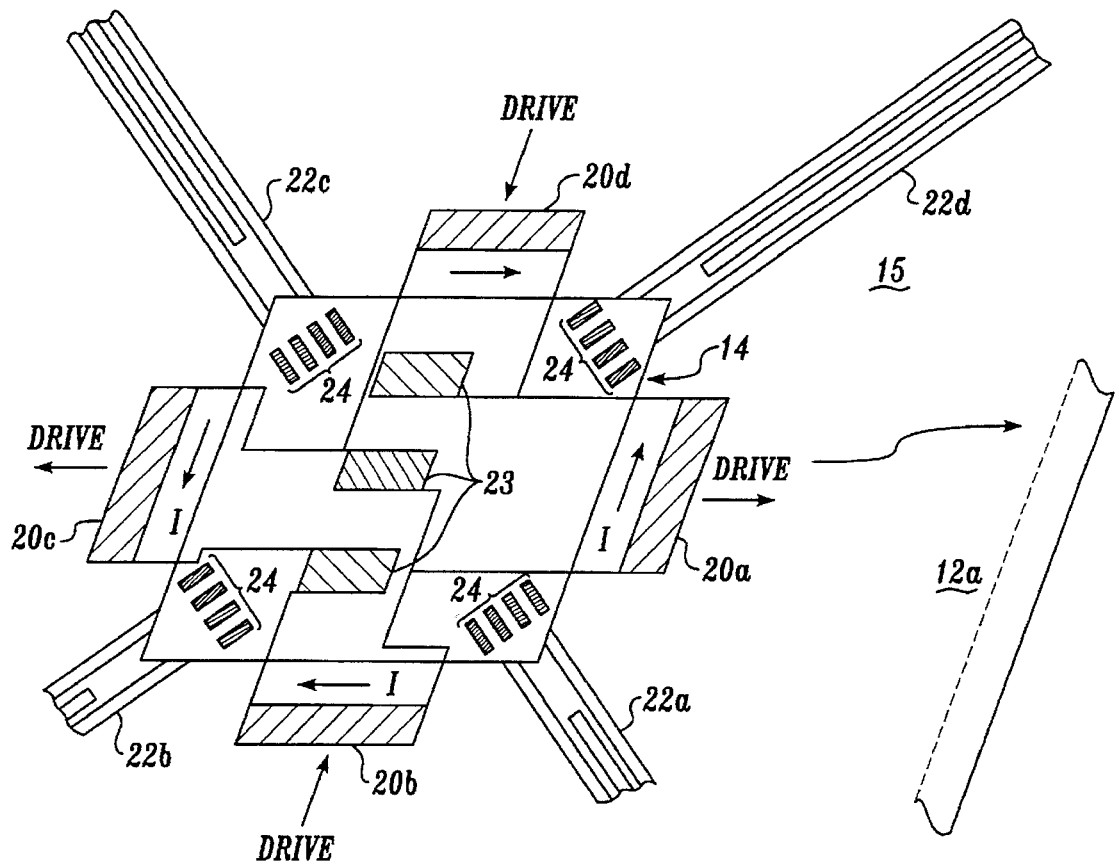
FIG. 4 is an enlarged fragmentary view of the drive and sensing devices including conductor pads formed on the under side of a silicon wafer substrate base of the box structure and DETF force sensors radiating from beneath a center mounting abutment out to the four corners of the box walls.

The resonant mode may be driven by an actuator electrode configuration in a permanenet magnetic field B as shown in FIG. 4. Four current conducting electrodes 20a, 20b, 20c and 20d paralleling the box walls are located proximate the center mounting structure 14 on epitaxial base 15 to serve as vibration drivers of the desired mode. The primary electrode current paths are oriented parallel to the walls they are driving.

The resulting Coriolis effect forces may be sensed by a variety of techniques. The preferred embodiment shown in FIG. 4 uses a set of four double ended tuning forks (DETFs) 22a, 22b, 22c and 22d etched in the plane of bottom base 15 of the "box" radiating between corners 13 of the walls and inner center mounting structure 14. These DETFs 22a–22d are preferably excited by the same magnetic field B which is used with drive current electrodes 20a–20d to excite the walls 12. Contact pads 24 for DETFs 22, and control pads 23 for electrodes 20 are disposed on the underside of base 15 opposite center mounting structure 14 for receiving connective wire leads.

Figure 5:
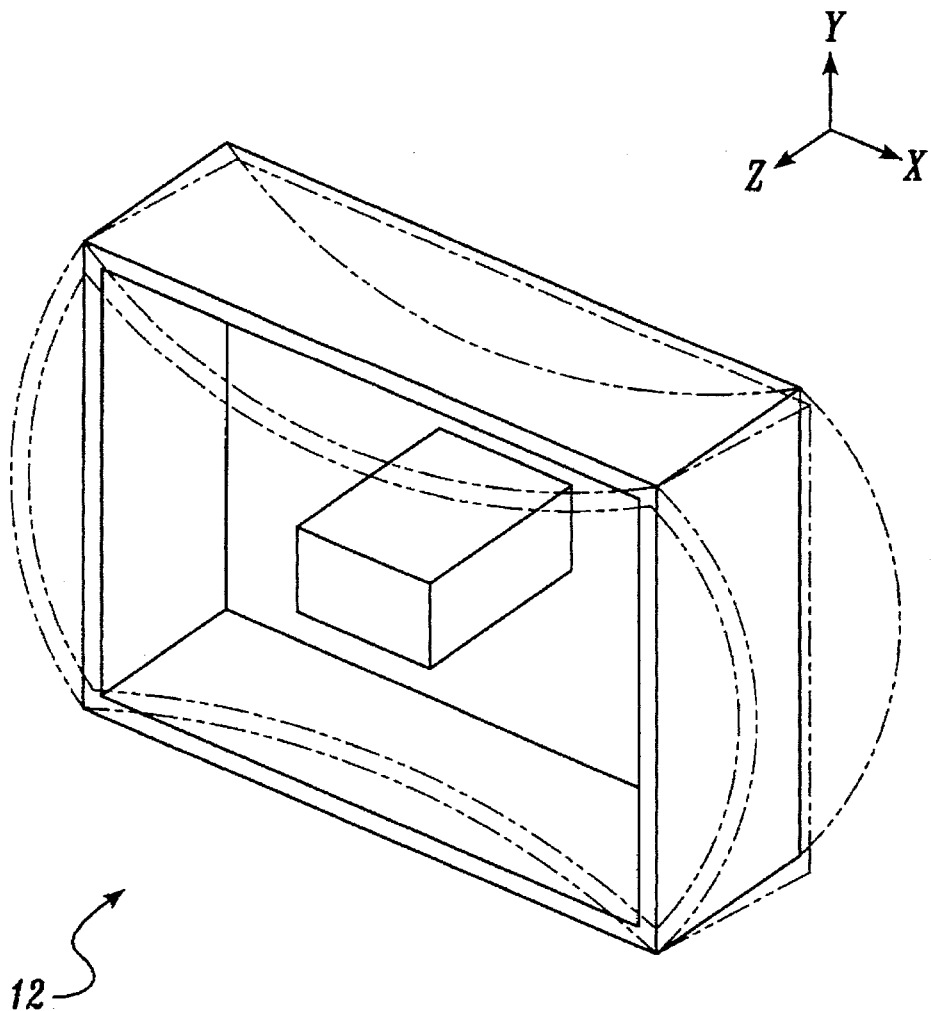
FIG. 5 is a computer simulated isometric view of the box structure induced into a natural mode of vibration and illustrating that the opposed walls of the box vibrate 180 degrees out of phase.

FIGS. 1, 2A–C, 3A–B, and 4 disclose a preferred embodiment of a vibrational gyroscope using the invention. The vibrating wall box has dimensions of approximately 3 mm per wall measured along the epitaxial base 15. The central mounting structure 14 is also a parallelogram with sides of 1 mm in length measured along the base. The thickness of the base 15 in the region between the walls 12 and the center mounting structure 14 is about 5 microns thick. This can lend itself to fabrication techniques used for crystalline silicon where this is the thickness of an epitaxial layer and used as a stop during the etching process. The walls 12 are about 100 microns thick and have a total height of about 2 mm resulting in a height to thickness ratio of about 20:1. A finite element simulated model of these dimensions was constructed to compute the modal vibration response. The desired mode is the first mode computed as 71311 Hz. A plot of this mode is shown in FIG. 5. A peak displacement of 240 µinches of each wall will produce stresses in the silicon structure of approximately 15000 psi which is below allowable limits and is measurable by the DETF sensors 22.

The Coriolis force per degree of rotation may be estimated from:

$$F/\Omega=2*d*\omega$$

where d=average displacement
$\omega$=frequency of desired vibration mode

The average displacement of each wall may be estimated as the peak displacement divided by four. The force developed in gs along each axis (two walls) is approximately 1.3 µg/deg/hr. For DETFs having a tine length of 0.8 mm, a width of 0.0034 mm and the thickness of the epi layer of 0.005 mm, the DETF frequency will be approximately 42000 Hz and the sensitivity of each DETF will be approximately 0.5 mili-Hz/deg/hr. When the output frequency change of two DETFs in opposite corners is denoted by f1 and f2, and the change of the remaining two by f3 and f4 the rate will be given by:

$$\text{Sensed rate}=S*(f1+f2-f3-f4)$$

where

S is a scale factor

The sensitivity of the device is enhanced by a factor of four and temperature effects are rejected since they will tend to cancel by common mode subtraction.

Figure 6:
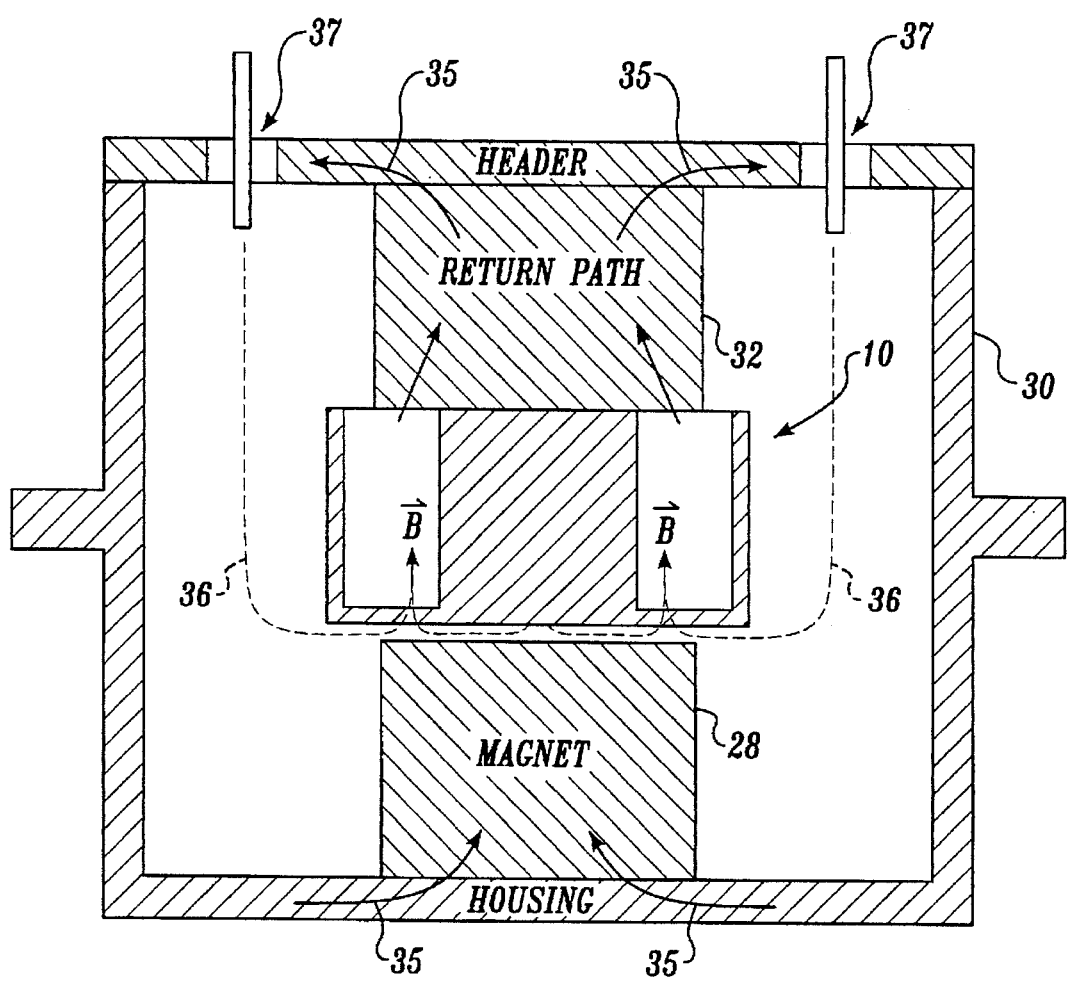
FIG. 6 is a sectional view of the preferred rate sensor package including an annular housing that surrounds and supports the internal vibrating box structure, cylindrical field magnet, field return path box support structure, and connecting leads, in which the housing is also part of the magnetic return path.

A suitable packaging configuration is shown in FIG. 6 which embodies the above rate sensing transducer, and includes an annular housing 30 and a permanent magnet 28 providing flux field B and a return path magnetic structure 32 that also serves as an attachment structure to which the center aubutment 14 is attached such as by bonding. The magnet 28, structure 32 and housing 30 which is also a high permeable material provide an efficient B field path 35 to the drive electrode transducers 20 and sensor DETFs 22. Permanent magnet 28 is disposed in close proximity to the transducer components to provide a magnetic flux B in a direction perpendicular to the base 15 of the silicon structure containing the electrodes. Permanent magnet 28 is secured to the inside bottom wall of housing 30 and structure 32 is likewise secured to the underside of a housing header 30a. Connective leads indicated by dotted lines 36 pass through sealed connections 37 in housing header 30a and extend to contact pads on the underside of base 15 of gyroscope 10. In addition, temperature compensation can be enhanced by known per se techniques such as using a thermistor or other temperature sensor within the package.

Figure 7:
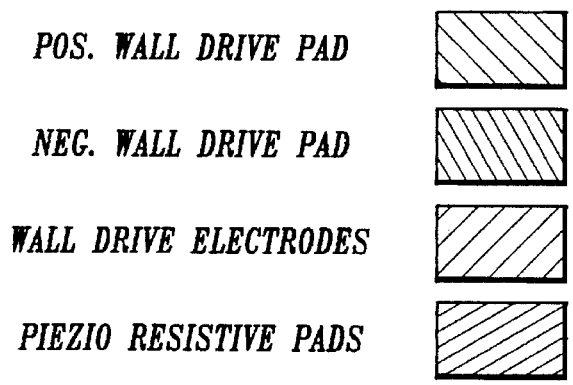
FIG. 7 is a view similar to FIG. 4 of an alternative embodiment using piezo resistive sensor elements on the substrate base, in place of the DETF transducers to convert sensed forces at the corners of the vibrating box walls into electrical signals representing angular rate.
Figure 7:
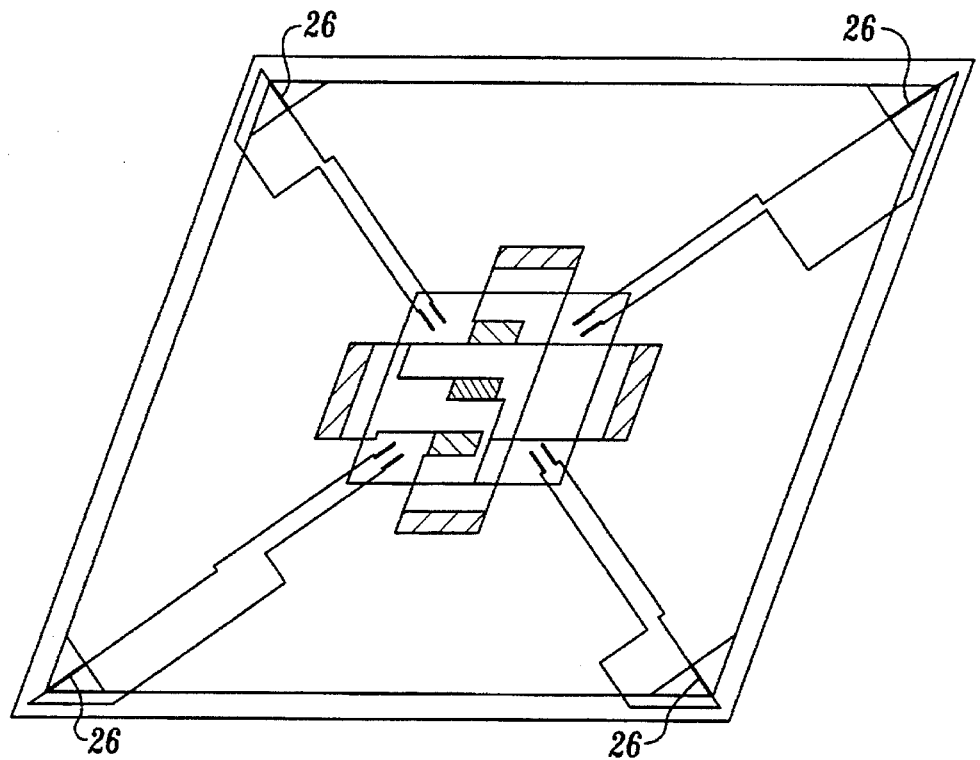

An alternate preferred embodiment replaces the DETFs with four piezo-resistive sensing elements 26 positioned in etched triangular shaped doped regions fabricated in base 15 at the corners of the walls as shown in FIG. 7. The drive electrodes are the same. A still further embodiment may replace the drive B field electrodes with capacitor drives doped on the silicon base 15.

While only particular embodiments have been disclosed herein, it will be readily apparent to persons skilled in the art that numerous changes and modifications can be made thereto, including the use of equivalent means, devices, and method steps without departing from the spirit of the invention.

We claim:

1. An angular rate sensor apparatus for determining an angular rate of rotation of a body, said sensor apparatus being of the type having a pair of mass structures that are periodically moved in a direction orthogonal to a Coriolis rate axis as a function of a periodic movement signal, whereby a Coriolis acceleration proportional to the angular rate of rotation about the rate axis produces forces on said mass structures that are converted by a transducer to an output signal proportional to Coriolis angular rate, and said sensor apparatus comprising:

a base;

a box structure having a bottom formed by said base and first and second pairs of opposed walls rising from said base connected at the corners and open at the top;

a wall drive for driving said first and second pairs of walls, respectively, into a mode of vibration in which the opposed walls of each pair vibrate 180 degrees out of phase; and a force responsive transducer mechanically coupled to at least one of said corners of said box structure for producing an electrical output signal representing Coriolis angular rate.

2. An angular rate sensor apparatus of claim 1 wherein said base and box structure are formed from a micromachined silicon substrate.

3. An angular rate sensor apparatus of claim 1 wherein said base and box structure are formed by an etched silicon crystalline substrate and said first and second pairs of opposed walls form a parallelogram configuration conforming to the crystalline molecular of the etched silicon substrate.

4. An angular rate sensor apparatus of claim 1 wherein said wall drive comprises a current conducting electrode adapted for connection to a source of alternating current, and a source of magnetic flux cooperating with alternating current in said electrode to generate a magnetic-current vibration force for driving said first and second pairs of box structure walls.

5. An angular rate sensor apparatus of claim 1 wherein said force responsive transducer comprises a double-ended tuning fork (DETF), a signal source for inducing vibration in said double ended tuning fork and output means for producing said electrical output signal representing Coriolis angular rate.

6. An angular rate sensor apparatus of claim 1 wherein said wall drive comprises current conducting electrodes supported on said base and adapted for connection to a source of alternating electrical current, and a magnetic flux field producing structure disposed proximate said electrodes interacting with alternating current in said electrodes to produce periodic movement that causes said mode of vibration at a natural frequency in said opposed walls of said box structure; and said force responsive transducer comprises at least one double ended tuning fork having electrodes adapted for connection to a source of alternating current and interacting with said magnetic field structure to produce resonant vibration that varies with changes in force at said one of said corners of said box structure.

7. An angular rate sensor apparatus of claim 1 wherein said base and box structure are formed from a monolithic crystalline structure and said corners of said first and second pairs of walls adjacent said base define nodal points that remain relatively fixed during vibration of said first and second pairs of walls, and said force responsive transducer senses forces at all corners of said box structure.

8. An angular rate sensor apparatus of claim 7 further comprising signal processing means for processing electrical output signals from said force responsive transducer and having common mode rejection of certain predetermined effects.

9. An angular rate sensor apparatus of claim 1 wherein said force responsive transducer is a piezo-resistive device.

10. An angular rate sensor apparatus of claim 1 wherein said wall drive comprises first and second opposed pairs of drive electrodes supported on said base in an area circumscribed by said walls of said box structure.

11. An angular rate sensor apparatus of claim 1 wherein said force responsive transducer comprises a separate said force sensing transducer for each of said corners supported on said base inside said box structure.

12. Apparatus for determining components of an angular rate of rotation of a body about a plurality of orthogonal rate axes comprising:

an angular rate sensor for each of the plurality of axes and including an open box structure having a supporting bottom, and first and second pairs of opposed walls connected at the corners and open at the top;

driver means for each rate sensor including means for producing a periodic movement in each of said first and second pairs of walls as a function of a periodic drive movement signal in a direction generally orthogonal to the respective rate axis with which the rate sensor is associated, output sensor means for sensing changing forces on said periodically moving walls caused by Coriolis forces and producing an output signal proportional to the angular rate of rotation of the body about the rate axis; and signal processing means connected to receiving the output signal from each rate sensor and the periodic movement signal for determining angular rate of rotation for each rate axis.

13. The apparatus of claim 12 wherein said open box structure is a micromachined body of crystalline material.

14. The apparatus of claim 13 wherein said material is silicon.

15. The apparatus of claim 14 wherein said bottom of said box structure is an epitaxial layer of silicon and said walls are formed by etching to said epitaxial layer.

16. The apparatus of claim 12 wherein said box structure has a center mounting structure adjoined to said bottom and spaced from said walls.

17. The apparatus of claim 16 further comprising a housing having an interior wall and within which said box structure is mounted, and including means for attaching said center mounted structure to a portion of said interior wall of said housing.

18. The apparatus of claim 17 wherein said driver means and said output sensor means require a magnetic field, and further comprising a magnetic path structure including a permanent magnet mounted inside said housing to supply said magnetic field and wherein said housing is made of a magnetically permeable material and forms a portion of said magnetic path structure.

* * * * *